Figure 6:
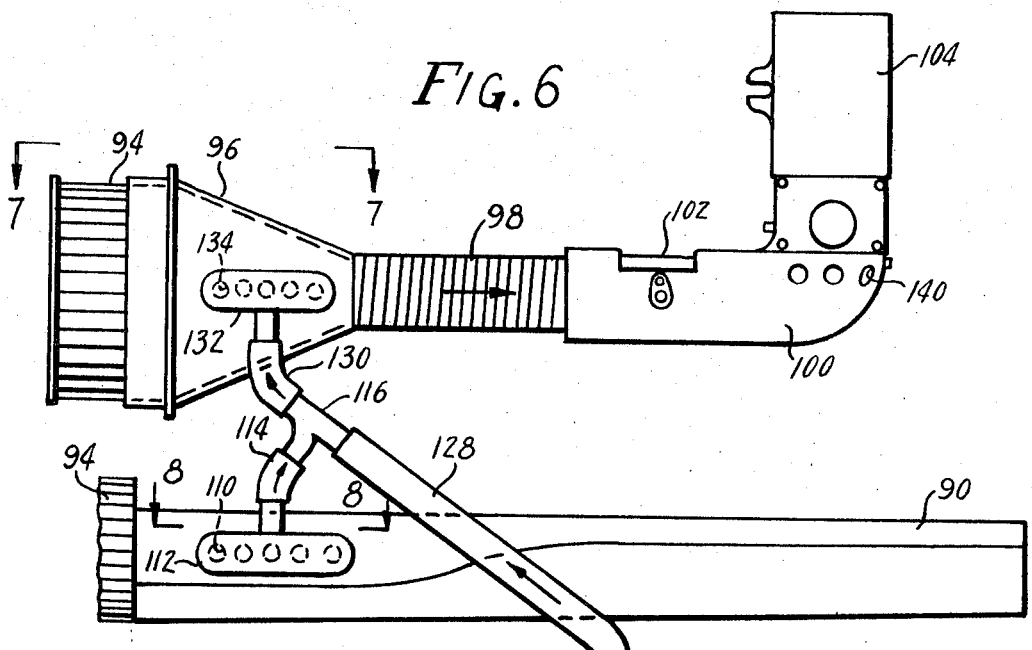

United States Patent

Bailey

[15] 3,656,462
[45] Apr. 18, 1972

[54] GAS SAVING AND ANTI-POLLUTION DEVICE

[72] Inventor: Ferrall W. Bailey, Route 2, Kirklin, Ind. 46050

[22] Filed: Oct. 7, 1970

[21] Appl. No.: 78,852

[52] U.S. Cl. .................................123/122 D, 98/2.05, 98/2.11
[51] Int. Cl. ................................F02m 31/08, F02m 31/14
[58] Field of Search ..................123/122, 122 D, 119, 119 D; 98/2.01, 2.05, 2.11

[56] References Cited

UNITED STATES PATENTS

| | | | |
|---|---|---|---|
| 1,581,365 | 4/1926 | Thavenet | 98/2.11 X |
| 1,774,352 | 8/1930 | Bull | 98/2.11 X |
| 2,105,497 | 1/1938 | Palmer | 98/2.11 |
| 2,112,101 | 3/1938 | Kliesrath | 98/2.05 X |
| 3,394,687 | 7/1968 | Scott | 123/119 |
| 3,513,817 | 5/1970 | Kearsley | 123/122 D |
| 1,115,745 | 11/1914 | Sibley | 123/122 D |
| 1,280,463 | 10/1918 | Henes | 123/122 D |
| 1,622,498 | 3/1927 | Dunn | 123/122 D |
| 1,780,092 | 10/1930 | Metz | 123/122 D |
| 2,398,094 | 4/1946 | Heymann | 123/122 D |
| 2,429,208 | 10/1947 | Matthews et al. | 123/122 D |
| 3,024,778 | 3/1962 | Townsend | 123/122 D |
| 3,473,522 | 10/1969 | Bailey | 123/122 D |

FOREIGN PATENTS OR APPLICATIONS

| | | | |
|---|---|---|---|
| 928,775 | 6/1947 | France | 123/122 D |

Primary Examiner—Al Lawrence Smith
Attorney—Victor J. Evans & Co.

[57] ABSTRACT

A hot air passageway from the exhaust manifold, an adjustable cold air passageway from the vehicle interior, a T connection for mixing the cold and hot air of both passageways, and a passageway connected to the air cleaner of a carburetor bringing the air mixture thereinto.

3 Claims, 9 Drawing Figures

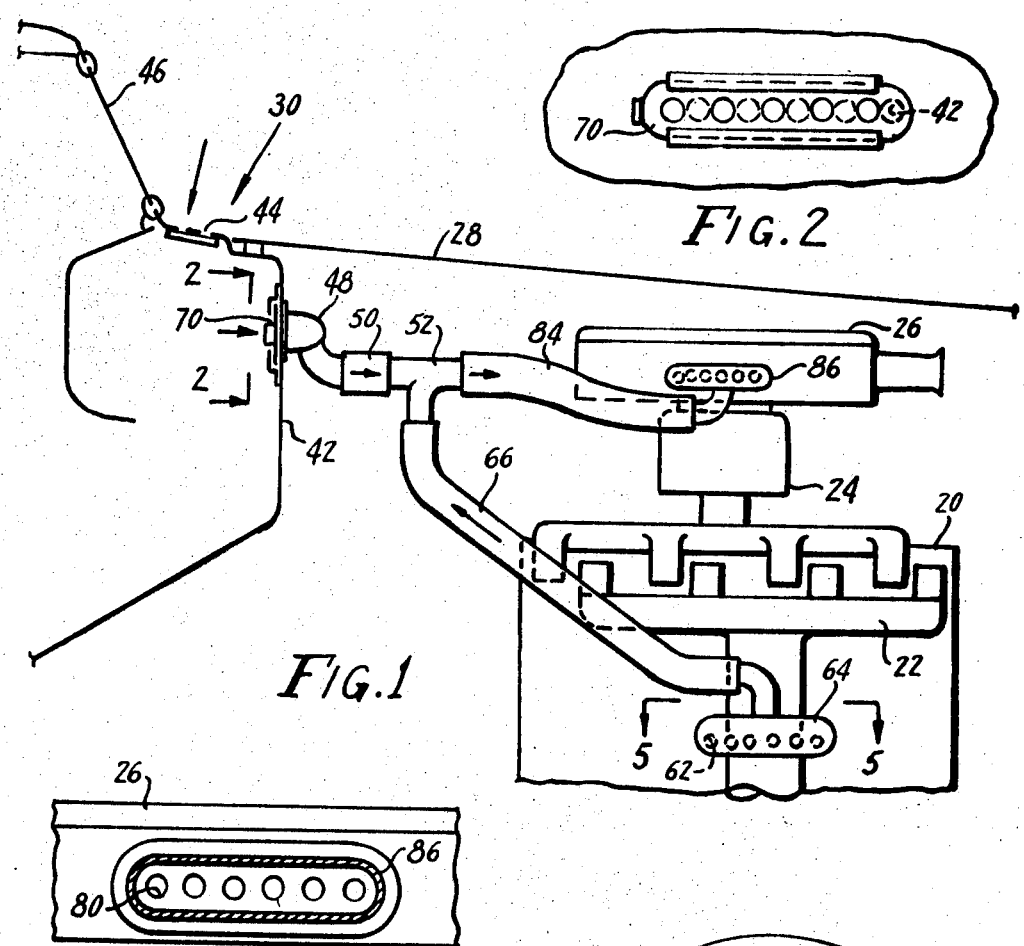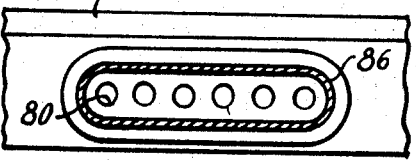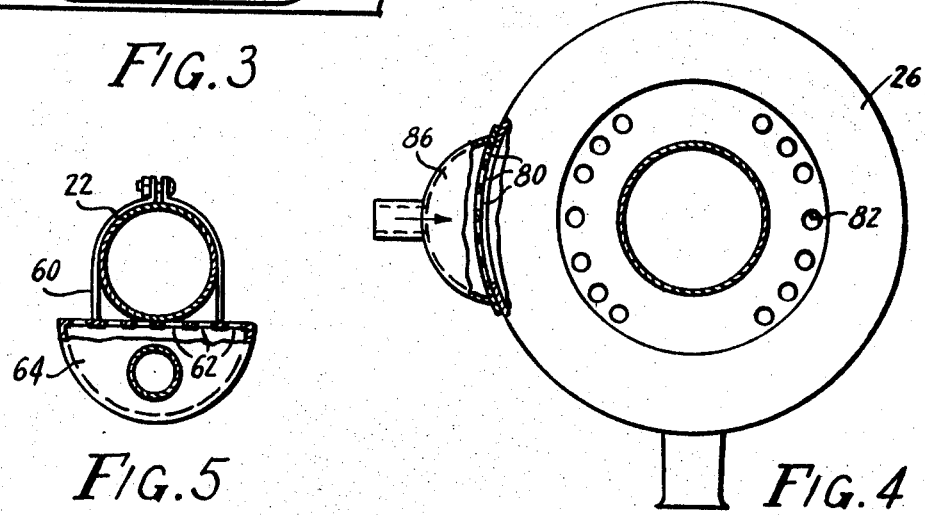

INVENTOR.
FERRALL W. BAILEY
BY Victor J. Evans &Co.
ATTORNEYS.

3,656,462

GAS SAVING AND ANTI-POLLUTION DEVICE

This invention relates to a gas mileage booster and pollution control device for internal combustion engines. This device increases the horsepower of the engine, saves on the wear of the spark plugs, cools the oil in the motor, cuts the amount of carbon in the carburetor, involves no working parts to worry about with respect to wear or break, is not adversely affected by the air condition unit in the vehicle or aircraft, involves the fusing of air within the carburetor which will in turn minimize pollution due to the vaporization within the carburetor system, minimizes the wear and carboning of the breather air filer, involves no countersunk parts to allow carbon to collect within the carburetor system, and slows down the build up of corrosion in the exhaust system due to the minimization of pollution.

Accordingly, a primary object of this invention is increased gas mileage.

Another primary object of this invention is the reduction of pollution without increased consumption of fuel and increased wear and tear within the engine.

Another object of this invention is its simplicity and adaptability in that it can be easily and quickly installed and transferred from one car to another.

A further object of this invention is the movement and mixing in a desired proportion of hot and cold air streams without the use of a vacuum pull.

Figure 7:
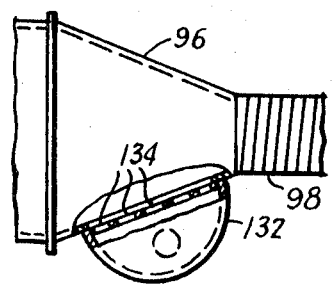
Figure 9:
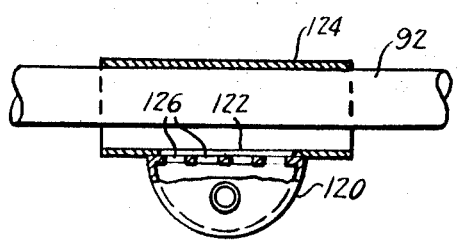
Figure 8:
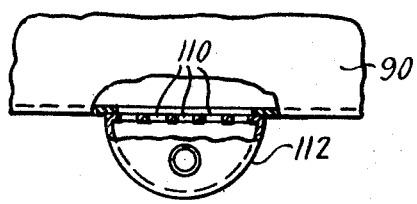

The above and other objects of this invention will become apparent to those skilled in the art after a consideration of the following detailed description of the preferred embodiments of this invention taken together with the accompanying drawing wherein:

FIG. 1 is a side elevational view of the apparatus;
FIG. 2 is a sectional view taken on line 2—2 of FIG. 1;
FIG. 3 is a cross sectional elevational view of the air breather connector of FIG. 1;
FIG. 4 is a plan view of the breather of FIG. 1;
FIG. 5 is a sectional view taken on line 5—5 of FIG. 1;
FIG. 6 is a variation of the apparatus for use in aircraft;
FIG. 7 is a sectional view taken on line 7—7 of FIG. 6;
FIG. 8 is a sectional view taken on line 8—8 of FIG. 6; and
FIG. 9 is a sectional view taken on line 9—9 of FIG. 6.

Referring in detail to the drawing, there is shown in FIG. 1 an internal combustion engine 20, an exhaust manifold outlet 22, a carburetor 24, and a breather 26 beneath the hood 28 of a vehicle 30.

As clearly shown in FIG. 2, there is a series of apertures 40 within the fire wall 42 through which cool air flowing in the direction of the arrows passes after coming in from the air vent below the front windshield 46. The cool air flows into a connector 48 mounted at one end thereof against the surface of fire wall 42 enclosing aperatures 40 on the front surface of fire wall 42 and connected at the other end thereof to a hose 50. Hose 50 is connected to one end of a plastic T 52 through which the cool air passes.

As clearly shown in FIG. 5, a connector 64 is mounted adjacent manifold outlet 22 by means of strap 60. Connector 64 has apertures 62 therein facing manifold outlet 22 and is connected to the vertical leg of T 52 by means of a hose 66. AS cool air is forced past the horizontal leg of T 52, a draft is created which brings heated air surrounding manifold outlet 22 into connector 64 and up hose 66. The cool air and the air which was heated due to radiated heat from the exhaust within manifold 22 mix within T 52 prior to entering breather 26. An adjustable slide valve 70 is slidably mounted over apertures 40 on the back surface of fire wall 42 in order to regulate the amount of cool air allowed to flow through T 52 and the amount of heated air allowed to be drawn up for mixing with the cooled air. By adjusting slide 70 so that a certain number of apertures 40 are uncovered, apertures 40 will be balanced with apertures 62 in order to mix both the cool air and warm air in the right proportion prior to vaporization within breather 26.

Breather 26 has a series of apertures 80, as clearly shown in FIG. 3, along a side portion thereof and a series of apertures 82 along a radial path in the bottom thereof, as clearly shown in FIG. 4. A hose 84 is connected between T 52 and a connector 86 which is mounted against the side of breather 26 enclosing apertures 80. The mixed hot and cold air fuse into breather 26 through apertures 80 after leaving T 52. Apertures 82 are balanced and equally spaced in a geometric pattern in order to allow the fused air to proportionally escape into the atmosphere when there is an excess amount of pressure so that the proper amount of fused air which is vaporized in the carburetor system is automatically controlled. It should be noted that apertures 80 are fixed to limit the passage of a certain amount of proportioned hot and cold air.

An aircraft air frame 90, an exhaust manifold 92, filter assembly 94 for carburetor air, duct assembly 96 for air intake, duct flexible hose valve assembly 98, carburetor air valve assembly 100, carburetor alternate air valve assembly 102, and carburetor 104 are shown in FIG. 6. In a similar manner with the operation described with respect to the embodiment disclosed in FIG. 1, cold air flowing past air frame 90 is forced past apertures 110 within a connector 112 and the cold air flows into a hose 114 and into a leg of a T 116, the heated air surrounding exhaust manifold 92 enters into an adjacent connector 120 by means of an opening 122 in the housing 124 upon which connector 120 is mounted and by means of the apertures 126 and connector 120 facing opening 122 because of a draft created by the passage of cold air through T 116 causing the heated air to be drawn up from connector 120 to another leg of T 116 by means of a hose 128, the cold air and heated air proportionately mixing within T 116 prior to entry in duct assembly 96. The mixed air enters connector 132 by means of hose 130 and fuses into duct assembly 96 by means of apertures 134. In the carburetor air valve assembly 100 there are a series of balanced apertures 40 below carburetor 12 for automatic control of air intake in a manner similar to that of apertures 82 in the embodiment shown in FIGS. 1 and 4.

In summation, the controlled supply of the amount of the appropriate proportioned cool and hot air to the carburetor system results in a more efficient combustion increasing gas mileage and reducing pollutants. While the preferred vehicle and aircraft embodiments have been illustrated and described, it will be understood by those skilled in the art that many modifications and changes may be resorted to without departing from the spirit and scope of the invention.

I claim:

1. A gas saving and anti-pollution apparatus for use with a motor vehicle of the type having a passenger compartment including a fire wall and an internal combustion engine having an exhaust manifold and a carburetor equipped with an air cleaner comprising a connector mounted on said fire wall and communicating through a plurality of apertures with the interior of the passenger compartment, a slide valve on said fire wall for adjustably closing said apertures, a conduit T, a flexible conduit connecting one leg of said conduit T and said connector, an air inlet connector secured to the exhaust manifold of the engine, a second flexible conduit connecting said air inlet connector with another leg of said conduit T, a third connector secured to said air cleaner and communicating with the interior thereof, and a third flexible conduit connecting said third connector to the third leg of said conduit T whereby cool air from said passenger compartment flows through said conduit T to said air cleaner and heated air is drawn thereby from said air inlet connector through said conduit T mixing therein with the cool air prior to reaching said air cleaner.

2. A device as claimed in claim 1 wherein said air inlet connector has a plurality of apertures arranged to draw heated air from around said exhaust manifold.

3. A device as claimed in claim 1 wherein said third connector has a plurality of apertures formed therein communicating with said air cleaner.

\* \* \* \* \*